United States Patent [19]

Veenis et al.

[11] Patent Number: 4,933,923
[45] Date of Patent: Jun. 12, 1990

[54] OPTICAL RECORD CARRIER INSCRIBED WITH READ-OUT CONTROL DATA AND APPARATUS FOR READING SUCH RECORD CARRIER IN CONFORMITY WITH SUCH CONTROL DATA

[75] Inventors: Aartje W. Veenis; Winslow M. Mimnagh, both of Eindhoven, Netherlands

[73] Assignee: U.S. Philips Corporation, New York, N.Y.

[21] Appl. No.: 209,442

[22] Filed: Jun. 15, 1988

[30] Foreign Application Priority Data

Jan. 26, 1988 [NL] Netherlands .......................... 8800170

[51] Int. Cl.⁵ .............................................. G11B 7/00
[52] U.S. Cl. .................................................. 369/44.11
[58] Field of Search ..................................... 369/44–46,
369/54, 106, 112, 122, 107, 115, 116; 250/205

[56] References Cited

U.S. PATENT DOCUMENTS 4,688,203 8/1987 Koishi et al. ................... 369/116 X
4,796,250 1/1989 Kobayashi et al. ............. 369/106 X

FOREIGN PATENT DOCUMENTS 2575857 7/1986 France .
59-60742 4/1984 Japan ..................................... 369/54
61-243974 10/1986 Japan .
61-260438 11/1986 Japan .
62-16255 1/1987 Japan .
63-103471 5/1988 Japan ..................................... 369/54

Primary Examiner—Robert L. Richardson
Attorney, Agent, or Firm—John Francis Moran

[57] ABSTRACT

An optical record carrier having an information recording track which is inscribed with control data indicative of the change in average level of read-out signals from recorded and unrecorded portions of the track. Read apparatus for such record carrier scans the track with a radiation beam and derives a read-out electrical signal therefrom. The apparatus includes a signal-processing circuit which is adjusted for operation at the average level of signals derived from recorded portions of the track, such average level being determined by a programmable control unit from the recorded control data and the measured average level of signals from unrecorded portions of the track. Tracking of the scanning beam is also controlled in conformity with the difference in average signal strength from recorded and unrecorded portions of the track.

14 Claims, 4 Drawing Sheets

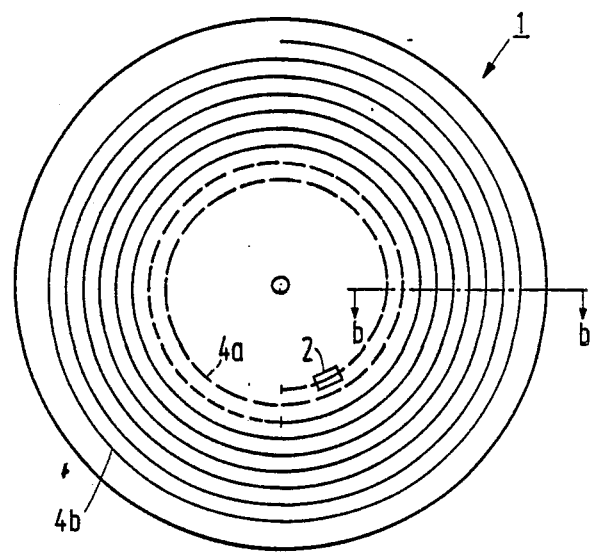
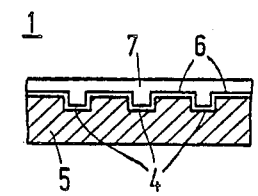
FIG.1b
FIG.1a
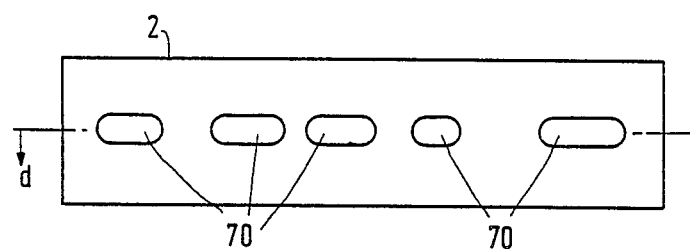
FIG.1c
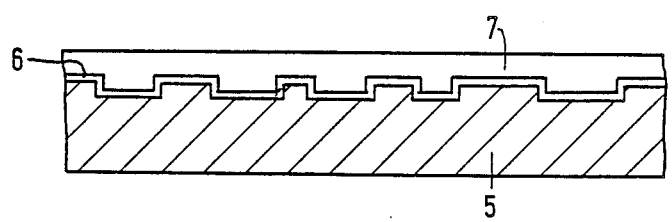
FIG.1d

OPTICAL RECORD CARRIER INSCRIBED WITH READ-OUT CONTROL DATA AND APPARATUS FOR READING SUCH RECORD CARRIER IN CONFORMITY WITH SUCH CONTROL DATA

BACKGROUND OF THE INVENTION

1. Filed of The Invention

The invention relates to an optically readable record carrier of the inscribable type, comprising a preformed track which comprises an information-recording area of a type which is subjected to an optically detectable change when exposed to radiation of an intensity above a specific write intensity.

The invention further relates to an optical read apparatus for reading information recorded in the information-recording area of such a record carrier as a pattern of recording marks with modified optical properties, which read apparatus comprises scanning means for scanning the track by means of a radiation beam, opto-electronic transducer means for converting the radiation beam reflected or transmitted by the track into an electric signal, and a signal-processing circuit for deriving from the electric signal an information signal is representative of the information recorded in the track being scanned.

2. Description of Related Art

Such a record carrier and read apparatus are known from U.S. Pat. No. 4,473,829.

The record carrier described therein comprises an information-recording area formed by a thin metal layer which can be removed by exposure to a high-intensity radiation beam. An information signal can be recorded by modulating the radiation beam in conformity with the information signal while the recording layer is scanned, so that by the local removal of the metal layer a pattern of recording marks of modified reflection is formed between which intermediate areas of unmodified reflection are interposed. When the information thus recorded is read the pattern of recording marks is scanned with a low-intensity radiation beam, the intensity of the reflected radiation beam being modulated in conformity with the pattern being scanned. By means of photodetectors the reflected radiation is converted into an amplitude-modulated electric signal whose modulation depth is proportional to the difference in reflection between the recording marks and the intermediate areas.

In the various types of inscribable record carriers which are currently known the relative difference in reflection between the recording marks and the intermediate areas varies from type to type, which results in variations over a range which is several factors larger than the range which can be handled by the customary read apparatuses. This is mainly caused by the fact that the processing circuits cannot readily handle those large differences in signal strength which result from such large differences in reflection. Therefore the signal-processing circuits must be equipped with comparatively intricate automatic signal-strength controls. Moreover, the response time of such automatic control systems is a drawback, because this results in the first part of the signal to be read not being read reliably.

SUMMARY OF THE INVENTION

It is an object of the invention to provide means enabling the signal-processing circuit to be adapted simply to the strength of the applied signals.

To this end, in accordance with a first aspect of the invention, the record carrier is characterized in that control data is recorded as a preformed information structure in a predetermined area in the track, which control data is indicative of the magnitude of said optically detectable change in reflection.

In accordance with a second aspect of the invention the read apparatus is characterized in that it comprises control means for causing the predetermined area of the track to be scanned prior to the actual read-out of the information recorded in the information-recording area, means for deriving from the detected electric signal a control-information signal which is representative of the recorded control data, and adjustment means which are responsive to the derived control information signal to adjust the signal-processing circuit.

If the record carrier is intended for recording EFM signals, for example a standard CD signal, it is advantageous to include the control data in the Q subcode channel of an EFM signal to be recorded by means of the preformed information structure. In that case the control data can be recovered simply by means of the subcode demodulator, which is needed anyway for controlling the process of reading the EFM signal recorded in the information-recording area.

In the Q-channel signal predetermined bit groups are employed to indicate the type of information represented by the subsequent bit groups. Thus, the position of the required control data can be indicated very simply by including a unique code in said predetermined bit groups.

The control data thus recorded can be readily recovered by read apparatus which is characterized in that the signal-processing circuit includes an EFM-subcode demodulator for deriving the Q-channel signal from the electric signal, and in that the adjustment means comprise detection means for detecting the unique code in the Q-channel signal, which code indicates the position of the control data, and for extracting the control data from the Q-channel signal upon detection of the unique code.

Another embodiment of the read apparatus is characterized in that the signal-processing circuit comprises at least one variable-gain amplifier for amplifying or attenuating the electric signal, the adjustment means being adapted to adjust the gain factor of such amplifier to a value which is substantially inversely proportional to the magnitude of the optically detectable change in reflection as indicated by the control-information signal.

This embodiment has the advantage that the amplitude of the high-frequency signal component in the electric signal, which amplitude depends mainly on the difference in optical properties between the information recording marks and the adjoining intermediate areas on a track, remains substantially constant regardless of the type of record carrier. The signal applied to that section of the signal-processing circuit which derives from the electric signal said high-frequency signal component then always has a constant amplitude, so that the signal-processing circuit can always be operated in an optimum operating range.

Yet another embodiment of the read apparatus is characterized in that the signal-processing circuit comprises a low-pass filter for extracting a low-frequency signal component from the electric signal, and comparison means for comparing the low-frequency signal component with a reference signal and generating a tracking control signal depending on the result of the comparison, the adjustment means being adapted to adjust the reference signal level during scanning of the pattern of information recording marks.

In this embodiment it is achieved that the change in average signal level caused by a signal recorded in the information-recording area has no influence on the reliability of the tracking which is performed under control of the tracking control signal.

BRIEF DESCRIPTION OF THE DRAWINGS

Further embodiments and advantages thereof will now be described in more detail, by way of example, with reference to FIGS. 1 to 8, in which FIGS. 1(a) through 1(d) show a record carrier of an inscribable type.

DESCRIPTION OF THE PREFERRED EMBODIMENTS

Figure 2:
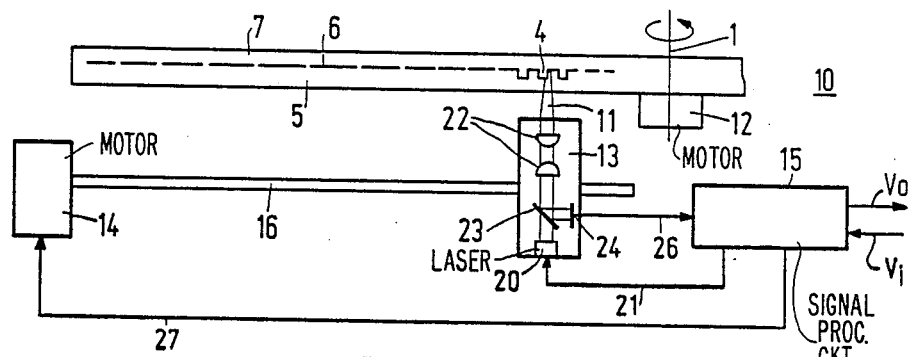
FIG. 2 shows an optical recording and/or read apparatus.

FIG. 1 shows an embodiment of a record carrier 1, FIG. 1a being a plan view and FIG. 1b being a cross-sectional view of a small part of said carrier, taken on the line b—b. The record carrier 1 is provided with a track 4, for example a preformed groove or ridge. The track 4 comprises an information-recording area 4b intended for recording an information signal. For the purpose of recording the record carrier 1 is provided with a recording layer 6, which is deposited on a transparent substrate 5 and which is covered with a protective coating 7. The recording layer 6 is of a material which is subjected to an optically detectable change if exposed to suitable radiation. Such a layer may be, for example, a thin layer of a metal such as tellurium. By exposure to laser radiation of sufficiently high intensity this metal layer can be melted locally, so that locally said layer is given another reflection coefficient. Alternatively, the layer 6 may be made of other radiation-sensitive materials, for example magneto-optical materials or materials which when heated are subjected to a structural change, for example, from amorphous to crystalline or vice versa. A survey of such materials is given in the book "Principles of Optical Disc Systems", Adam Hilgar Ltd; Bristol and Boston, pp. 210–227.

It is to be noted that for the sake of clarity the distance between the turns of the spiral track 4 in FIG. 1 has been exaggerated strongly. For a typical record carrier the distance between the tracks is 1 to 2 μm in the case of a track width of 0.4–1.3 μm.

FIG. 2 shows an optical recording and read apparatus 10. The apparatus 10 comprises a drive motor 12 for rotating the record carrier 1, an optical head 13 which is arranged opposite the rotating record carrier 1 and by means of which a radiation beam 11 can be aimed at the track 4 of the record carrier 1, an actuating device, for example a motor 14 and a spindle 16, for radially moving the optical head 13. The optical head 13 comprises a laser 20 which produces the radiation beam 11 whose intensity is determined by a control signal 21. The radiation beam 11 is aimed at the track 4 by means of a lens system 22. By means of a semi-transparent mirror 23 the reflected radiation beam is aimed at an optical-electronic transducer 24, which generates a sum signal whose signal strength corresponds to the intensity of the reflected radiation beam 11. The sum signal 26 is applied to a signal-processing circuit 15 of the recording and/or read apparatus which processes it so as to derive the intensity control signal 21 and a speed control signal 27 for the motor 14.

The apparatus 10 further comprises customary means (not shown) for keeping the radiation beam 11 aimed at and focussed on the track 4 under the control of signals generated by the electro-optical transducer 24.

Figure 3:
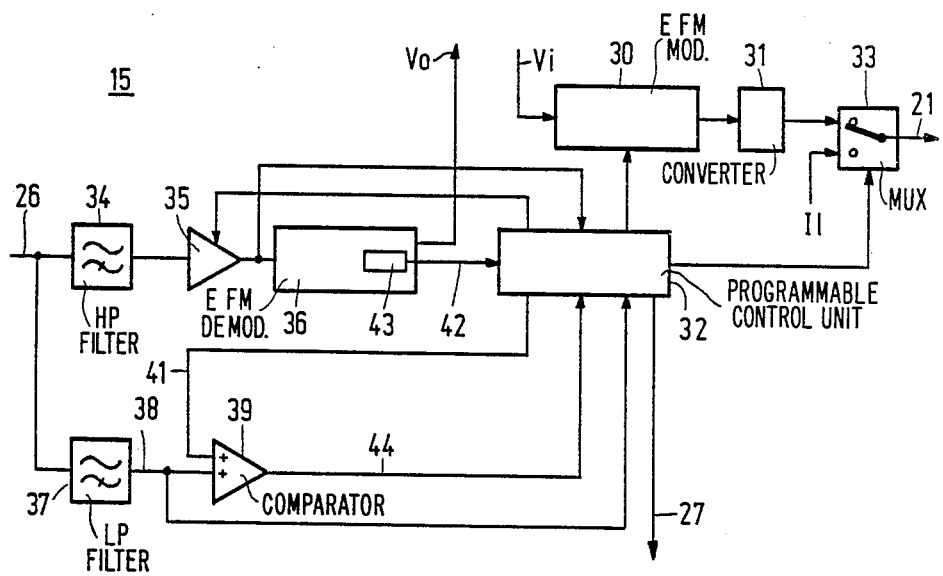
FIG. 3 shows an embodiment of the signal-processing circuit for use in a read apparatus in accordance with the invention.

FIG. 3 shows an example of the signal-processing circuit 15 comprising an encoding circuit, for example an EFM modulator 30 of a customary type, by means of which an information signal Vi to be recorded can be converted into an EFM-modulated signal.

The EFM-modulated signal on the output of the EFM modulator 30 is applied to a circuit 31, which converts the EFM-modulated signal into a series of control pulses for the laser 20, as is described comprehensively in, for example, the afore-mentioned U.S. Pat. No. 4,473,829. The output of the circuit 31 can be applied to the laser 20 via a multiplex circuit 33 controlled by a programmable control unit 32. In response to the control pulses the laser 20 emits radiation pulses of an intensity adequate to bring about the change in reflection in the portion of the track 4 where the radiation beam 11 is incident, so that a pattern of recording marks with modified reflection is formed in the track 4, which pattern is representative of the signal Vi to be recorded.

Figure 4:
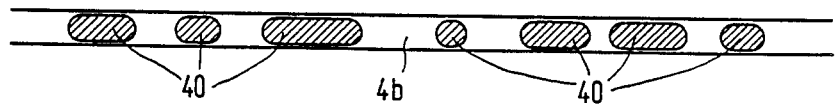
FIG. 4 shows a pattern of recording marks having modified optical properties which is formed in the information-recording area, FIG. 5 (a, b) illustrates the effect of a signal recorded in the track on the low-frequency component of the electric signal generated by the electro-optical transducer of the read apparatus.

FIG. 4 shows an example of a pattern of recording marks 40 thus formed in the track portion 4b.

If the information thus recorded in the track portion 4b is to be read the pattern of recording marks 40 must be scanned with the radiation beam 11, the intensity of the radiation beam 11 now being adjusted to a level which is too low to produce a change in reflection. The low intensity of the radiation beam 11 can be selected by setting the multiplex circuit 33 by means of the control unit 32 to a state in which a control signal I1 appearing on one of the inputs of the multiplex circuit 3 and corresponding to the low-intensity level is applied to the laser 20. During scanning of the pattern of recording marks 40 the intensity of the reflected radiation beam 11 is modulated inconformity with said pattern, the modulation depth being determined mainly by the difference in reflection between the recording marks 40 and the intermediate areas interposed between the recording marks.

By means of a high-pass filter 34 the signal component representing the intensity modulation produced by the pattern of recording marks is extracted from the sum signal 26, which is proportional to the intensity of the reflected radiation, beam. In order to be converted into an information signal Vo this signal component is applied to an EFM demodulator 36 of a customary type via an variable-gain amplifier circuit 35, for example in the form of a multiplier circuit. The EFM demodulator 36 comprises a sub-code demodulator 43 for recovering the Q-channel signal included in the EFM signal. The Q-channel signal is applied to the control unit 32 via a signal line 42, which unit controls the read process in a customary manner by means of the applied Q-channel signal.

The control unit 32 adjusts the gain of the amplifier circuit 35 to a value for which the amplitude of the signal on the output of the amplifier 35 is situated within the optimum operating range of the EFM demodulator 36.

Figure 5B:
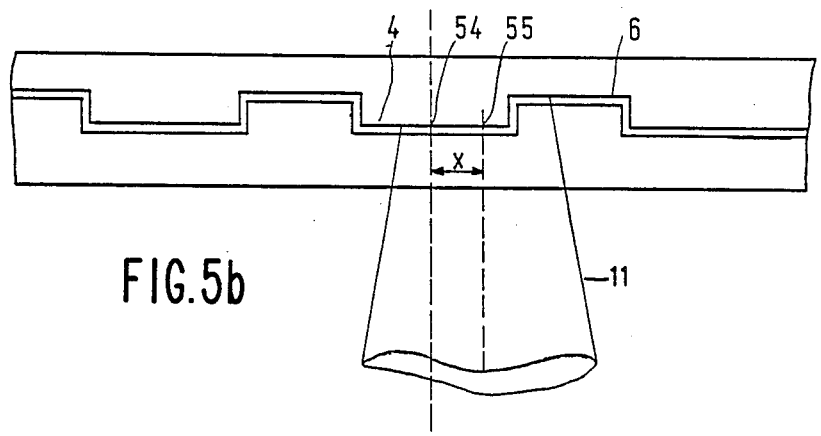
Figure 5A:
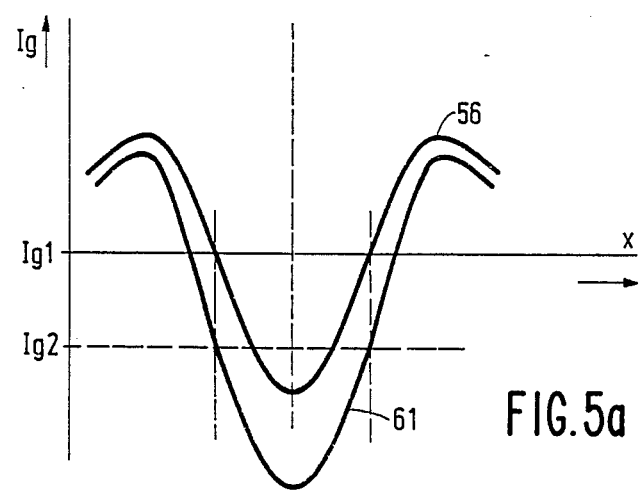

The low-frequency component is extracted from the sum signal 26 by means of a low-pass filter 37. This low-frequency component represents the average intensity of the reflected radiation beam 11. The average intensity of the reflected radiation beam depends on the position of the position of incidence of the beam on the record carrier 1 relative to the centre of the track 4. FIG. 5a represents the signal value Ig of the output signal 38 on the output of the low-pass filter 37 as a function of the distance x, as shown in FIG. 5b, between the centre 54 of the track 4 and the centre 55 of the position of incidence of the beam 11 on the recording layer 6. The curve 56 represents the signal value Ig in the case that a portion of the track 4 has scanned which is not yet been provided with a pattern of recording marks 40. As is apparent from FIG. 5a the curve 56 exhibits a minimum if the beam 11 is aimed at the centre of the track 4. If the radiation beam is incident halfway between two tracks 4 the curve 56 exhibits a maximum, so that when the track 4 is scanned it is possible to determine from the output signal 38 whether the radiation beam 11 follows the track 4. That is effected by means of a comparator 39 which compares the signal Ig on line 38 with a reference signal on line 41 having a reference level Ig1.

The logic value of the output signal 44 of the comparator 39 then indicates whether the track 4 is followed correctly. The reference level Ig1 can be determined simply by radially scanning a blank portion of the record carrier with the radiation beam 11 under control of the control unit 32 prior to reading and then determining the average value of the output signal 38. For this purpose the control unit 32 is loaded with a suitable program. To control the tracking of noninscribed tracks the control unit adjusts the signal level of the reference signal 41 in conformity with the average value determined during radial scanning. When a portion of the track 4 is scanned in which information is recorded as a pattern of recording marks 40 the problem arises that the relationship between the level of the signal 38 and the position of the scanning beam 11 has changed as a result of the presence of the recording marks 40 with modified reflection coefficient.

In FIG. 5a the curve 61 gives the relationship between the level of the signal 38 and the position of the scanning beam 11 in the case that a signal has been recorded in the track 4. It will be evident from FIG. 5a that during scanning of an inscribed track 4 a correct tracking control signal is obtained by adjusting the reference level of the reference signal 41 to a value Ig2. The reduction of the average value of the reflected radiation beam is substantially proportional to the difference in reflection between the recording marks 40 and the intermediate areas between the recording marks, so that the value Ig2 of the reference level can be derived from the value Ig1 simply by multiplying the latter by a predetermined value in conformity with the relationship Ig2=R.Ig1, where R is the predetermined ratio between the average difference in reflection after and before recording. As described in the foregoing the adaptation of the signal level of the reference signal 41 and the adjustment of the gain factor of the amplifier 35 depends only on the difference in reflection between the recording marks 40 and the intermediate areas between said marks. The magnitude of this difference in reflection depends strongly on the type of record carrier. Therefore it is desirable to readjust the gain factor of the amplifier 35 and the reference signal 41 each time that another type of record carrier is to be used.

A very convenient adjustment method can be obtained if at a predetermined position in the track 4 of the record carrier 1 control information is recorded as a preformed information structure, for example a pattern of pits, which control information is indicative of the change in reflection produced from the recording layer 6 of the relevant record carrier after it has been exposed to a beam intensity above the write level.

If record carriers are employed which are intended for recording EFM signals, it is preferred to include said control information in a table of contents (TOC) recorded in a lead-in track.

The lead-in track, which is constituted by a portion of the track 4 which is not intended for information recording, bears the reference numeral 4a in FIG. 1. FIG. 1c shows a strongly enlarged portion 2 of the lead-in track 4a, which comprises a pattern of prerecorded pits 70. FIG. 1d is a cross-sectional view of the record carrier portion 2, taken on the line d—d.

The Q-channel of the EFM signal is very suitable for recording the control information. This Q-channel comprises 98 bits, which are recorded in each EFM subcode frame together with the other information.

Figure 6:
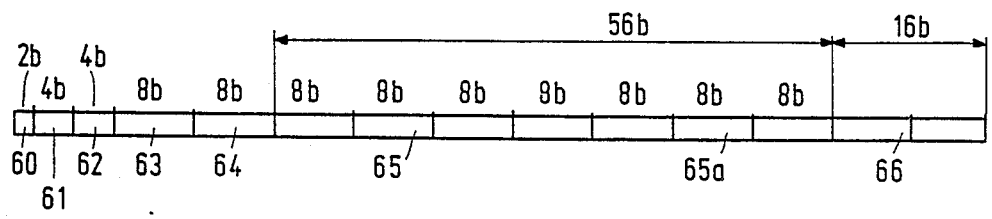
FIG. 6 illustrates the format for the Q-channel signal in the standard EFM signal.

FIG. 6 illustrates the format of the 98 bits of the Q-channel of a subcode frame. The 98 bits are arranged in one 2-bit group 60, two 4-bit groups 61 and 62, two 8-bit groups 63 and 64, one 56-bit group 65 and one 16-bit group 66. The bits of group 60 are used for synchronization. The bits of group 61 are employed as control bits. In the lead-in track 4a the 12 bits of groups 62 and 63 represent a code "100" (hexidecimal) which indicates that the relevant track portion forms part of the lead-in track 4a.

By means of the 8-bits of the group 64 the type of information stored in the group 65 is characterized. The 16 bits of group 66 are employed for error detection.

By means of a unique bit combination, for example FF (hexidecimal) it is possible to indicate that the bits in the group 65 represent information on the record carrier parameters. A number of these bits, for example the three least-significant bits of the subgroup 65a, are employed to indicate the magnitude of the change in reflection of the recording layer 6 after this layer has been exposed to radiation of an intensity above the minimum write intensity. The other bits of group 65 can be employed to specify other parameters, for example the desired write intensity and the desired write strategy.

The control information relating to the record-carrier parameters can be recovered simply from the Q-channel bits during scanning of the lead-in track 4a, which channel bits are applied to the programmable control unit 32 via the signal line 42.

Figure 7:
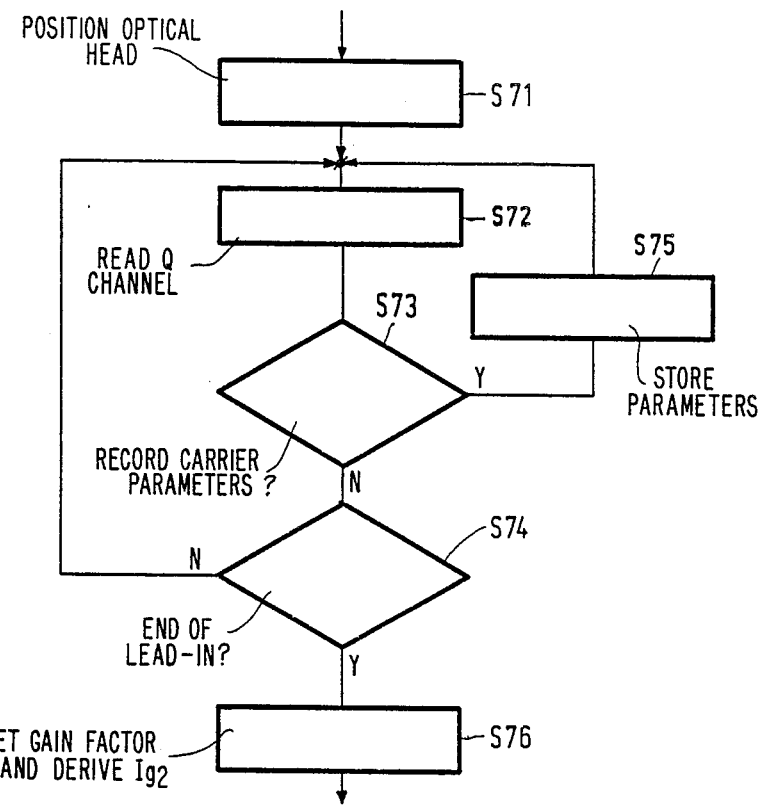
FIGS. 7 and 8 are flow charts of programs performed by a control unit in the signal-processing circuit in order to adjust said signal-processing circuit.

FIG. 7 gives a suitable program for control unit 32 for deriving from the Q-channel bits the settings of the gain factor of the amplifier 35 and the setting of the average level Ig1 and Ig2 of the reference signal on line 41. This program is carried out each time that the read apparatus 10 is put into operation after replacement of the record carrier. In step S71 the optical head 13 is positioned opposite the lead-in track 4a by means of the motor 14 and the spindle 16 under control of the control unit 32. Subsequently the process of reading the information recorded in the lead-in track 4a is started. Moreover, during the radial displacement of the head 13 the average signal value of the signal 38 is determined while an uninscribed part of the record carrier 1 is scanned. That average signal value constitutes the reference value Ig1.

In step S72 a block of 98 associated Q-channel bits is read and in step S73 it is ascertained by means of the bits of the groups 62, 63 and 64 whether the group 65 contains information on the record-carrier parameters. If this is the case the information on the change in reflection represented by the bits in the group 65a is stored in a memory of the control unit 32 in step S75. Subsequently the program proceeds with step S72, in which a subsequent block of 98 Q-channel bits is read in. If during step S73 it is found that no parameter information is stored in block 65 step S73 is followed by step S74, in which it is ascertained by means of the read-in block of Q-channel bits whether the end of the lead-in track 4a is reached. If this is not the case, the program proceeds with step S72. If the end of the lead-in track is reached step S76 is performed, in which the gain factor for the amplifier 35 is adjusted to a value which is inversely proportional to the value of the change in reflection derived from the Q-channel bits, so that the amplitude of the signal on the output of the amplifier 35 during reading of the pattern of recording marks 40 becomes independent of the type of record carrier used. Moreover, in step S76 the signal value Ig2 is derived from the value of Ig1 and the previously determined values Ig1 and of the change in reflection. The signal value Ig2 are also stored in the memory of the control unit 32.

Figure 8:
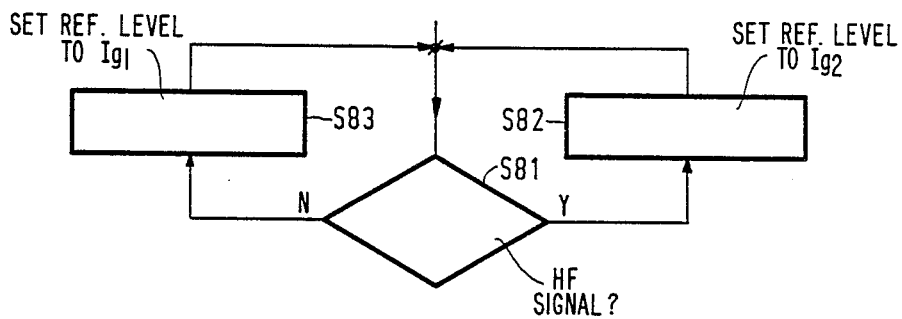

FIG. 8 shows an example of a suitable further program for control unit 32 for adjusting the signal level of the reference signal 41. The program comprises a step S81 to detect whether a high-frequency signal appears on the output of the amplifier 35. If such a signal is present the signal level of the reference signal 41 is adjusted to the value Ig2 during step S82. If this signal is not present the signal level of the reference signal 41 is set to the value ig1 during step S83. The steps S82 and S83 are again followed by the step S81.

What is claimed is:

1. A optically readable record carrier having a preformed information-recording track with an optical property which is modified upon exposure to radiation, information being recorded on said track in the form of a pattern of recording areas in which said optical property has been modified by radiation, interspersed with intermediate unrecorded areas in which said optical property is unmodified; such pattern resulting from scanning of the track by a beam of radiation of an intensity which in the recording areas is above a specific write intensity so as to modify said optical property in said recording areas; characterized in that control data is recorded in a predetermined portion of said track which does not include recorded information, said control data signifying the change in said modified optical property in said recording areas as compared with said unmodified optical property in said intermediate areas.

2. A record carrier as claimed in claim 1, characterized in that perdetermined portion of said track is a lead-in portion situated at the beginning thereof.

3. A record carrier as claimed in claim 1 or 2, characterized in that said control data is included in a channel of a sub-code frame of an information signal which is recorded on said track.

4. A record carrier as claimed in claim 3, characterized in that said control data is at a position in said channel identified by a unique code included in said channel.

5. Apparatus for reading an optical record carrier having an information-recording track with an optical property which is modified upon exposure to radiation above a specific write intensity, and on which information is recorded in the form of a pattern of recording areas interspersed with intermediate areas, said optical property being modified in said recording areas and being unmodified in said intermediate areas; control data being recorded in a lead-in portion of said track which does not include recorded information, said control data signifying the change in said optical property in said recording areas relative to said optical property in said intermediate areas; said apparatus comprising:
   means for scanning said track with a radiation beam;
   opto-electronic transducer means for converting radiation from said track into an electrical read-out signal;
   signal processing circuit means for deriving from said read-out signal (i) said control data, (ii) a signal corresponding to radiation from said lead-in portion of said track, and (iii) an information signal corresponding to the information recorded on said track; said processing circuit being adjustable for optimum operation over a selected amplitude range of said read-out signal; and
   a programmable control unit programmed to:
      (a) control said scanning means to scan said lead-in portion of said track before scanning other portions thereof;
      (b) derive from said control data and said lead-in track signal a first reference value ($I_{g1}$) corresponding to the average amplitude of said read-out signal from unrecorded portions of said track, and a second reference value ($I_{g2}$) corresponding to the average amplitude of said read-out signal from recorded portions of said track; and
      (c) adjust said signal processing circuit means for optimum operation for a read-out signal having an amplitude equal to said second reference value Ig2.

6. An apparatus as claimed in claim 5, wherein said control data is included in a channel of a sub-code frame of said information signal and at a position in said channel identified by a unique code included in such channel; and further characterized in that said signal-processing circuit means comprises a demodulator for deriving said channel from the read-out signal produced by said transducer means, and detection means for detecting said unique code and deriving said control data from said channel.

7. An apparatus as claimed in claim 5, characterized in that said signal-processing circuit means comprises at least one variable gain amplifier for amplifying or attenuating the said read-out signal, said control unit being adapted to adjust the gain factor of said amplifier substantially inversely proportional to the magnitude of said second reference value ($I_{g2}$).

8. An apparatus as claimed in any of claims 5, 6 or 7, further characterized in that said signal-processing circuit means further comprises: a low-pass filter for extracting a low-frequency component from said read-out signal; and comparison means for comparing said low-frequency signal component with a reference signal value supplied by said control unit, said comparison means generating a beam tracking control signal depending on the result of such comparison; said reference signal value supplied by said control unit being equal to said first reference value $I_{g1}$ when said read-out signal includes a high-frequency signal component, and being equal to said second reference value $I_{g2}$ when said read-out signal does not include a high-frequency signal component.

9. Apparatus for reading an optical record carrier having an information-recording track with an optical property which is modified upon exposure to radiation above a specific write intensity, and on which information is recorded in the form of a pattern of recording areas interspersed with intermediate areas, said optical property being modified in said recording areas and being unmodified in said intermediate areas; control data being recorded in a predetermined portion of said track which does not include recorded information, said control data signifying the change in said optical property in said recording areas relative to said optical property in said intermediate areas; said apparatus comprising:
   means for scanning said track with a radiation beam;
   opto-electronic transducer means for converting radiation from said track into an electrical read-out signal;
   signal processing circuit means for deriving said control data from said read-out signal; and
   a control unit for controlling said scanning means to scan said predetermined portion of said track before scanning other portions thereof, and deriving from said control data a control signal for adjusting said signal processing circuit means in accordance with the change in said optical properties signified by said control data.

10. Apparatus as claimed in claim 9, characterized in that said signal processing circuit means is adjustable for optimum operation over a selected amplitude range of said read-out signal, and said control unit is further adapted to adjust said signal processing circuit means for optimum operation over an amplitude range selected in accordance with said control data.

11. An apparatus as claimed in claim 10, wherein said control data is included in a channel of a subcode frame of said information signal and at a position in said channel identified by a unique code included in such channel, and further characterized in that said signal processing circuit means comprises a demodulator for deriving said channel from the read-out signal produced by said transducer means, and detection means for detecting said unique code and deriving said control data from said channel.

12. Apparatus as claimed in claim 11, characterized in that said signal processing circuit means comprises at least one variable gain amplifier for amplifying or attenuating said read-out signal, said control unit being adapted to adjust the gain factor of said amplifier substantially inversely proportional to the change in said optical property signified by said control data.

13. Apparatus as claimed in claim 9, characterized in that said signal processing circuit means further comprises: a low-pass filter for extracting a low frequency component from said read-out signal; comparison means for comparing said low frequency signal component with a reference signal value supplied by said control unit, said comparison means generating a beam tracking control signal depending on the result of such comparison; said reference signal value supplied by said control unit being equal to a first reference value $I_{g1}$ when said read-out signal does not include a high frequency signal component and being equal to a second reference value $I_{g2}$ when said read-out signal includes a high frequency signal component; and means for deriving said second reference value $I_{g2}$ from the product of said first reference value $I_{g1}$ and a value determined by said control data.

14. An apparatus as claimed in claim 13, wherein said control data is included in a channel of a subcode frame of said information signal and at a position in said channel identified by a unique code included in such channel, and further characterized in that said signal processing circuit means comprises a demodulator for deriving said channel from the read-out signal produced by said transducer means, and detection means for detecting said unique code and deriving said control data from said channel.

* * * * *